Figure 1:
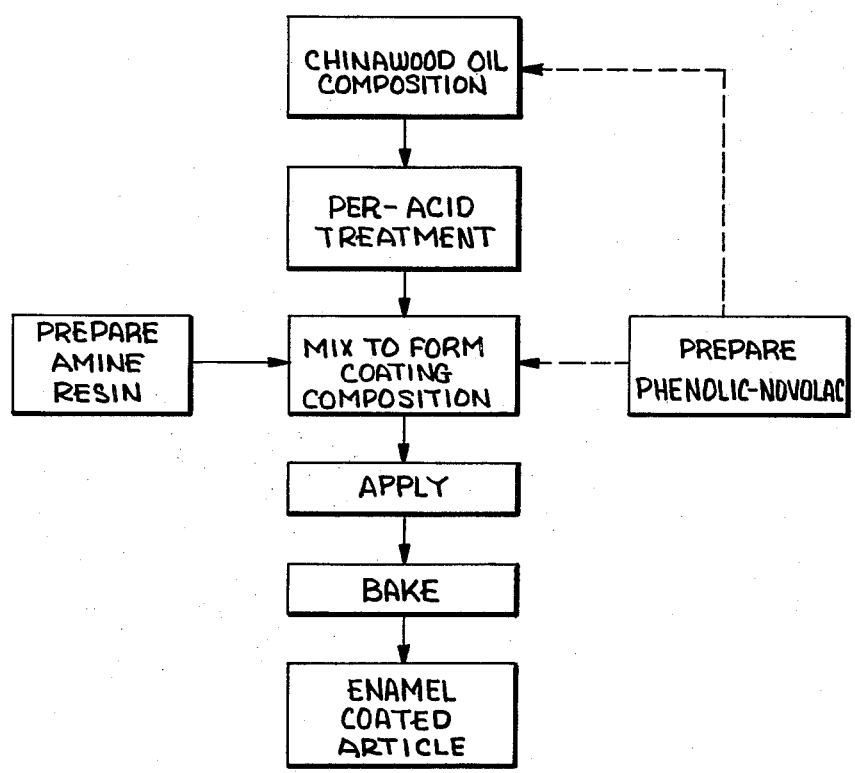

INVENTORS
ABRAHAM RAVVE, SOL B. RADLOVE
& JOSEPH W. BREHAUT

BY Mason, Porter, Diller & Stewart,

ATTORNEYS

United States Patent Office 3,188,235
Patented June 8, 1965

3,188,235
CHINA-WOOD OIL AND AMINE RESIN COMPOSITIONS
Abraham Ravve and Sol B. Radlove, Chicago, Ill., and Joseph W. Brehaut, United States Army, assignors to Continental Can Company, Inc., New York, N.Y., a corporation of New York
Filed Oct. 3, 1960, Ser. No. 86,835
20 Claims. (Cl. 117—161)

This invention relates to oleoresinous enamel compositions which cure rapidly, and can be cured by flame or high temperature high speed oven technique; more particularly, it relates to such a composition and its cured product wherein a chemically modified China-wood oil and a resin are combined.

Oleoresins based upon China-wood or tung oil have been employed in enamels for metal such as tin plate, but cure too slowly in high-speed flame ovens, or in high-speed convection ovens, where the coating is subjected to a temperature above 500 degrees F. for short periods of time. The products of this invention can also be cured satisfactorily by conventional oven techniques, at lower temperatures, e.g., 400 degrees F.

There have been prior proposals for epoxidizing vegetable oil compositions: for example, epoxidized soy bean and linseed oils are obtainable commercially with up to 7 percent epoxidation. Such vegetable oils include fatty acid groups whose long hydrocarbon chains include isolated double bonds. The linseed oil fatty acids, for example, have such double bonds, but these are differently arranged from the double bonds of China-wood oil fatty acids; e.g., there is not the triple conjugated relationship which is present in the China-wood oil fatty acids such as the linkage

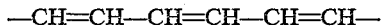

When the procedures employed for linseed oil are used for epoxidation of China-wood oil, the epoxidation effect is usually about ½ to 1 percent, with a maximum of 2 percent. With soy bean and linseed oils, the epoxidation treatment causes no significant thickening: whereas with China-wood oil, a thickening or increase of viscosity occurs, with a change of color from a yellow to a pale straw color.

The behavior of the epoxidized (7 percent) soy bean oil with the phenol:aldehyde:amine curing agent set out below is that of producing a cheesy material rather than a hard, flexible, thermoset coating as described below, under identical fast baking conditions.

An object of the invention is the preparation of an enamel composition and its cured product, based upon China-wood oil in which the double bonds have been subjected to treatment with a peroxide, e.g., by hydrogen peroxide in the presence of an acid, and including an amine resin effective for reaction with the treated tung oil.

Another object is the preparation of an enamel composition and its cured product, based upon China-wood oil which has been subjected to the aforesaid peroxide treatment, and including an amine resin effective for reaction with the chemically modified oil; wherein polymerization is effected upon heating without demanding an uptake of oxygen.

Another object is the preparation of such an enamel composition and its product, in which the curing is effected in the presence of a primary or secondary amine resin.

Another object is a procedure of preparing an oleoresinous enamel coating composition by treating an oleoresin prepared from China-wood oil and a phenolic novolac resin, by a peroxidizing agent, and then blending with a phenolic amine resin, wherewith the product can be applied and cured quickly.

A further object is a procedure of preparing an oleoresinous enamel composition by treating China-wood oil with a peroxidizing agent, and thereafter blending with a phenolic novolac resin to form an oleoresin, and with a phenolic amine resin, wherewith the product may be applied and cured quickly.

Another object of this invention is a procedure of preparing a resinous composition by treating China-wood oil with a peroxidizing agent, and thereafter blending with a phenolic amine resin, wherewith the product can be applied and cured quickly.

With these and other objects in view as will become apparent in the course of the following description and claims, illustrative embodiments of the invention will be set out.

The molecular structure in China-wood or tung oil is a glyceride of unsaturated acid of 18 carbon atoms, largely eleostearic acid having conjugated unsaturation between the 9th–10th, 11th–12th, and 13th–14th carbon atoms of the chain, which can be expressed as

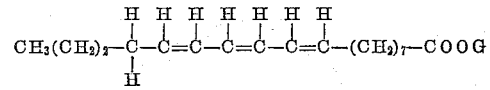

where G indicates connection to a glyceryl group.

It is preferred to conduct the reaction by a peracid: including such organic acids as performic, perpropionic, and higher such as perbenzoic acid; and inorganic acids such as pertungstic acid. These acids may be pre-formed, or produced in situ by the initial reaction of the selected acid such as formic, with hydrogen peroxide. In situ production is preferred because the reaction is then easily conducted without plant hazards. Therewith, the chemical modification is accomplished in an acid medium.

The modification which takes place in this reaction is limited to only a few percent in the most optimum case. Nevertheless, a viscosity increase of the oil accompanies this reaction and the product cures readily with primary and secondary amines by application of heat.

*Example 1*

An oleoresinous enamel composition was prepared by heating together 50 percent by weight of China-wood oil (12½ gallon oil length) and 50 percent by weight of paraphenylphenol formaldehyde resin (the product commercially available under the trade name of BR-254 for the Bakelite Company was used).

508 grams of the oleoresinous product were taken up in about 1,200 milliliters of methyl isobutyl ketone (commonly abbreviated as MIBK) and placed in a three-necked, three-liter flask. 33 milliliters of 90 percent aqueous formic acid solution and 10 grams of acid-activated cationic ion-exchange resin (that commercially available under the trade name IR-120 from Rohm and Haas was used) are added, and a thermometer and stirring device employed. With stirring, 210 grams of 70 percent aqueous hydrogen peroxide solution was added slowly over a two hour period, keeping the temperature between 40 and 45 degrees C. An exothermal reaction developed, which lasted about four hours. The batch was kept overnight at between 40 and 50 degrees C., for a total of about 20 hours. An additional 400 milliliters of methyl isobutyl ketone was added; and the batch was dehydrated by an azeotropic distillation under vacuum (29 inches of mercury), returning the solvent to the reaction flask until the water had been eliminated and the product was dry. The excess methyl isobutyl ketone was removed under vacuum at about 50 degrees C. until the resin foamed. 200 milliliters of butyl Cellosolve was added, and the batch filtered to give a clear resin solution, with 30.2 percent solids.

The paraphenylphenol aldehyde resin is illustrative of phenol-aldehyde novolacs. Para-tertiary-butyl phenol; aldehyde novolac has been found satisfactory: and other alkyl substituted phenols can be employed with aldehyde condensation to provide the novolac resin.

A phenolic amine was separately prepared in a three-necked, three-liter flask fitted with a thermometer and a stirrer. 470 grams of phenol (monohydroxybenzene: molecular weight 94; 5.0 moles employed) was introduced together with 1040 grams of 36 percent aqueous formaldehyde solution (375 grams formaldehyde: molecular weight 30; 12.5 moles employed). The flask was set up in a cold water bath to remove the heat of reaction. 760 grams of 28 percent aqueous ammonia solution (212.5 grams ammonia: molecular weight 17; 12.5 moles employed) was added slowly with stirring, the temperature being kept below 50 degrees C. The reaction mixture was then heated for one hour at 60 degrees C., followed by one hour at 80 to 85 degrees C. The batch was then dehydrated at about 35 to 40 degrees C. under a vacuum of 29 inches of mercury. 500 milliliters of amyl alcohol were added; and azeotropic distillation continued to complete elimination of water. In the final stages of the dehydration, the pot temperature was raised to about 65 degrees C. to assure dissolution of lumps of the wet resin. Excess amyl alcohol was distilled off under vacuum until the batch foamed. Upon completion, the solution of the phenolic amine resin in amyl alcohol was crystal clear, with 64 percent solids.

Seven parts by weight of the above-treated oleo-resin and three parts by weight of the phenolic amine resin were mixed, noting that the above solutions can be employed as such because the solvents blend without precipitation of solids. The organic enamel solution is applied to the substrate, e.g., tin plate, by roller or spray, and can be flame-cured at 550 to 575 degrees F. in 4 to 4½ seconds, or can be oven cured at 410 degrees F. in five to seven minutes.

The reaction of the phenol, aldehyde and amine may be represented as:

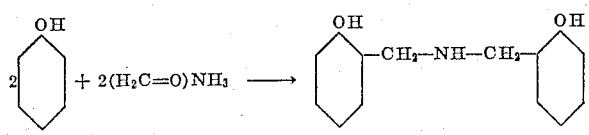

This is a secondary amine in behavior: and is representative of primary and secondary amines in initiating the interaction. Tertiary amines, without hydrogen coupled to the nitrogen link, are not useful, because their action is too slow. Similar results have been attained by interactions between the epoxidized China-wood oil oleoresin and urea formaldehyde resin, at similar ratios of proportion. This is of secondary amine structure:

Example 2

775 grams of China-wood oil were mixed with 800 milliliters of methyl isobutyl ketone, 15 grams of acid washed cationic exchange resin (the commercially available IR–120 resin above was employed), and 49 milliliters of 90 percent aqueous formic acid solution, and placed in a three-necked, three-liter flask with thermometer and stirring device. 315 grams of 70 percent aqueous hydrogen peroxide solution were introduced dropwise over a three hour period. The exothermal reaction was vigorous: the temperature was maintained below 45 to 50 degrees C. After four hours, the exothermal reaction slowed down, and the temperature decreased to 38 degrees C. during a time of two hours: vacuum was employed and azeotropic distillation conducted at about 29 inches of mercury and a temperature of about 45 degrees C. to effect removal of the acid and water, with the temperature being raised to 55 degrees C. at the last stages to eliminate as much of the remaining solvent as possible. The product was dissolved in 200 milliliters of butyl Cellosolve, and the solution filtered. The liquid was light colored and had a solids content of 55.9 percent.

11.4 grams of para-phenylphenol:formaldehyde novolac resin (the form commercially available under the trade name BR-254 was employed) were dissolved in 25 milliliters of butyl Cellosolve, with heating. Upon cooling, 24 grams of the above-treated China-wood oil solution were added, and then 21.6 grams of the phenolic amine of Example 1 (57.0 percent solids in amyl alcohol). The viscosity was reduced for roller coating by adding ten cubic centimeters of additional butyl Cellosolve; and a trace of an iron naphthenate drier added. Upon roller coating a tin plate, and baking as in Example 1, the cured coating was hard, insoluble, and resistant to food products.

This composition was flame cured in approximately 4 seconds to yield a flexible film. Chloroform extraction of the cured film yielded 13% extractables, indicating a high degree of cross-linking.

The butyl Cellosolve:amyl alcohol mixtures of solvents in the above examples are illustrative of the volatile solvents which can be employed to form the liquid composition for application to the substrate. In general, aromatic and ketone solvents are useful. While volatile aliphatic hydrocarbons are not true solvents for the produced solids components, they can be employed as diluents to attain the desired solids content and viscosity.

Example 3

An excellent coating may be produced from a chemically modified tung oil produced from:

815 g. raw tung oil
840 ml. butyl acetate
15.4 g. Dowex 50W–X8 resin (cationic exchange resin—TM. Dow)
51.5 ml. 90% formic acid (aqueous solution)
330 g. 70% hydrogen peroxide (aqueous solution)

The hydrogen peroxide was added to the other components placed in a 5 liter, three-necked flask fitted with a stirrer and a thermometer. The addition was regulated to allow the exotherm to reach and be maintained at about 60–65 degrees C. The reaction was completed when the batch had reacted at 60–65 degrees C. for a total of seven hours. The reaction mixture was cooled and the acid was neutralized with 60 grams of 28% ammonia solution. Two water washes were employed, followed by (1) a vacuum drying operation, (2) the addition of fresh butyl acetate, and (3) a filtration; which yielded a clear oil solution containing 56.8% solids. The solids had an acid value of 10.2.

A phenolic amine for mixture therewith was produced from:

416 g. (2 moles) purified normal octyl phenol
282 g. (3 moles) phenol
852 g. (10.5 moles) 37% formaldehyde (aqueous solution)
638 g. (10.5 moles) 28% ammonium hydroxide (U.S.P. 28% "ammonia water")

The ammonia was added dropwise to the other reactants placed in a three-necked, 5 liter flask fitted with a stirrer and a thermometer. The addition was regulated to keep the temperature at about 60 degrees C. The batch was then heated for one hour at 65–70 degrees C., followed by two hours at 85–90 degrees C. The water was removed under 26 inches (mercury) of vacuum until the resin became very viscous. Upon the addition of 500 ml. of amyl alcohol and heat, the resin dissolved. The residual water was removed by distilling the azetrope under like vacuum. The resin was advanced by heating at 85–90 degrees C. for a period of about 5–6 hours until a Stokes cure test (150 degrees C.) of 91 seconds was reached.

The addition of 500 mls. each of amyl alcohol and butyl Cellosolve gave a resin solution with 37.6% solids.

The liquid coating composition was prepared by mixing 45 percent by weight of the above solution of chemically modified China-wood oil and 55 percent by weight of the above phenolic amine resin: a trace of iron naphthenate drier was added, and the viscosity adjusted by adding butyl Cellosolve. Specimens of tin plate, with draw-downs of the composition thereon, were baked for 6, 8 and 10 minutes at 415 degrees F.; and flexible coatings were produced on the electrotin plate: that is, the specimens could be flexed without cracking or detachment of the coatings. Chloroform extraction of the cured coatings was employed, to determine the degree of cure; and it was found:

| Bake Time (minutes) | Film Thickness (mg./sq. in.) | Percent Extractables |
| --- | --- | --- |
| 6 | 3.9 | 12.6 |
| 8 | 3.6 | 4.8 |
| 10 | 3.2 | 3.3 |

Specimens with the liquid coating composition thereon were cured in an oven at 700–800 degrees F. for about 14 seconds; and likewise gave a flexible film, which yielded 7 to 8 percent extractables with chloroform.

Solvents other than methyl isobutyl ketone can be employed as the inert diluent during the chemical modification of the China-wood oil molecule. In general, inert aromatic, ketone, chlorinated hydrocarbon and ester solvents for the oil may be used singly or in mixture, which are volatile well below the curing temperature so that they are expelled. As indicated by the examples, the same solvent may be present during the reaction, and in the preparation of the coating mixture.

Formic acid is expelled during the dehydration and azetropic distillation. Residues remain but can be ignored, as such is without normal effect upon the composition or its curing: these traces can be eliminated by filtration through an anionic ion exchange resin, or by the addition of gaseous or aqua ammonia.

Alternatively, the purificaiton of the peracidation product, the reaction product can be shaken with water with settling and decanting to remove the major portion of the acid; and this followed by anionic filtration or alkali neutralization if desired.

Figure 2:
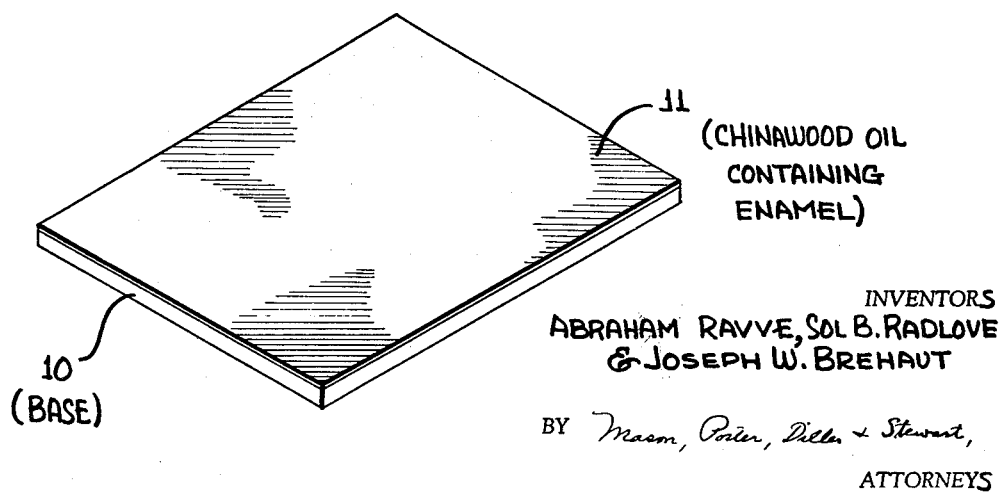

In the drawing:

FIGURE 1 shows a flow sheet of the method of manufacturing the coating composition and the baked enamel product in which the optional addition points of the novolac resin are shown by dotted lines; and FIGURE 2 shows a substrate article on which is a film of the enamel which has been applied and cured.

Referring to FIGURE 1, the method steps contained in all of the Examples 1–3 which are necessary steps are shown in solid lines. These steps are: the per-acid treatment of the composition containing the China-wood oil radical to produce the chemically modified China-wood oil radical composition and then the addition of an amine resin thereto to produce the final coating composition prior to the steps of applying and baking in order to produce the enamel product of the invention. The addition step of the phenolic-novolac resin is optional as Example 3 contains no such novolac resin. Example 1 states the addition of the novolac to the China-wood oil in order to produce a composition containing the China-wood oil radical. Example II teaches that the novolac resin may be added together with the amine resin to the chemically modified China-wood oil radical containing composition in order to produce the coating composition. This step is illustrated by the dotted lines.

FIGURE 2 of the drawing shows an illustrative employment of the enamel coating on the surface of an article, in which the tin plate 10 provides a metal substrate to which a film of the enamel has been applied and baked as a coating 11. The relative thicknesses have been exaggerated, noting that the coating 11 may have a thickness far less than that of the metal plate 10.

The cured coating material has a hardness comparable to that attained by the slow curing of an oleoresinous enamel prepared from China-wood oil and the same resin. A sheet metal plate coated therewith can be fabricated without breakage or cleavage of the coating. Upon subjecting a can end, fabricated from such a coated CMQ iron sheet, to the usual test by contact with an acid copper sulfate bath, a rating as high as 100 is obtainable after two minutes bath exposure, signifying that no enamel fracturing had occurred. Further, such coated articles have excellent resistance to boiling water and dilute acids: and will withstand steam at 240 degrees F. and 15 lbs. pressure for two hours, which exceeds normal processing conditions.

Infrared studies of the cured coating indicate that where a secondary amine curing agent has been used, many of the secondary amine groups have been tied in and are now tertiary amines: and there are only traces of unsaturation left.

It is obvious that the invention and its practice are not limited to the specific examples, and that it can be employed in many ways within the scope of the appended claims.

What is claimed is:

1. The method of preparing a quick-curing enamel, which comprises treating a composition containing a solid content of at least 50% China-wood oil therein with a per-acid in the presence of an acid-activated ion-exchange resin until substantially the end of exothermal reaction, and mixing the product of such treatment in a volatile organic solvent with an amine resin selected from the group consisting of phenolic amine resins and urea formaldehyde resins having therein a group selected from the class consisting of primary and secondary amine groups, the proportion of the amine resin to the product of the per-acid treatment being sufficient to furnish cross-linking therebetween.

2. The method as in claim 1, in which the China-wood oil containing composition is an oleoresin produced by cooking China-wood oil and a phenolic novolac resin, and the product is then treated with the per-acid.

3. The method as in claim 2, in which the novolac resin is a para-phenylphenol:formaldehyde condensate.

4. The method as in claim 2, in which the novolac resin is a para-tertiary butyl:formaldehyde condensate.

5. The method as in claim 1, in which the amine resin is a phenol:formaldehyde:amine resin.

6. The method of preparing a quick-curing enamel, which comprises treating China-wood oil with a per-acid in the presence of an acid-activated ion-exchange resin until substantially the end of exothermal reaction, and mixing the product of such treatment in a volatile organic solvent with an amine resin selected from the group consisting of phenolic amine resins and urea formaldehyde resins having therein a group selected from the class consisting of primary and secondary amine groups in an amount sufficient to furnish cross-linking therebetween.

7. The method as in claim 6, in which a phenolic novolac resin is admixed into the solution of China-wood oil and amine resin.

8. The method of preparing a quick-curing enamel, which comprises treating a composition containing at least 18 percent of China-wood oil therein with a per-acid in the presence of an acid-activated ion-exchange resin until substantially the end of exothermal reaction, and mixing the product of such treatment in a volatile organic solvent with an amine resin selected from the group consisting of phenolic amine resins and urea formaldehyde resins having therein a group selected from the class consisting of primary and secondary amine groups in an amount sufficient to furnish cross-linking wth the product of the per-acid treatment.

9. The method of preparing a quick-curing enamel, which comprises treating China-wood oil with a per-acid in the presence of an acid-activated ion-exchange resin until substantially the end of exothermal reaction, and mixing the product of such treatment in a volatile organic solvent with an amine resin selected from the group consisting of phenolic amine resins and urea formaldehyde resins having therein a group selected from the class consisting of primary and secondary amine groups, the weight proportion of the amine resin to the product of the per-acid treatment being in a range of 45:55 to 65:35.

10. A quick-curing enamel composition comprising a volatile organic solvent, the product of treating China-wood oil with a per-acid until substantially the end of exothermal reaction, and an amine resin selected from the group consisting of phenolic amine resins and urea formaldehyde resins having therein a group selected from the class consisting of primary and secondary amine groups, the proportion of the amine resin to the product of the per-acid treatment being sufficient to furnish cross-linking therebetween.

11. An enamel composition as in claim 10, including a phenolic novolac resin.

12. An enamel composition as in claim 10, in which a phenolic novolac resin is included with said China-wood oil during the treating of the China-wood oil with the per-acid in an amount not greater than 50% of the total solids weight.

13. A quick-curing enamel composition comprising a volatile organic solvent, the product of treating China-wood oil with a per-acid until substantially the end of exothermal reaction, and an amine resin selected from the group consisting of phenolic amine resins and urea formaldehyde resins having therein a group selected from the class consisting of primary and secondary amine groups, the weight proportion of the amine resin to the product of the per-acid treatment being in the range of 45:55 to 65:35.

14. An article of manufacture, comprising a substrate having thereon a coating which is the product of heating an enamel film comprising the product of treating China-wood oil with a per-acid until substantially the end of exothermal reaction in the presence of an amine resin selected from the group consisting of phenolic amine resins and urea formaldehyde resins having therein a group selected from the class consisting of primary and secondary amine groups, and the proportion of said amine resin to said product of the per-acid treatment being sufficient to furnish cross-linking therebetween.

15. An article as in claim 14, in which the film also contains a phenolic novolac resin.

16. An article of manufacture comprising a substrate having thereon a coating which is the product of the baked residue of a liquid enamel composition comprising a solution in a volatile organic solvent of a mixture of the product of treatment by a per-acid of China-wood oil in a composition containing the said oil, and an amine resin selected from the group consisting of phenolic amine resins and urea formaldehyde resins having therein a group selected from the class consisting of primary and secondary amine groups in an amount sufficient to furnish cross-linking with said product of the per-acid treatment.

17. The article of manufacture of claim 16 wherein a phenolic novolac resin is included with said China-wood oil during the treating of the China-wood oil with the per-acid in an amount not greater than 50% of the solid weight.

18. An article of manufacture, comprising a substrate and a coating thereon which is the product of heating an enamel film comprising the product of treating China-wood oil with a per-acid until substantially the end of exothermal reaction in the presence of an amine resin selected from the group consisting of phenolic amine resins and urea formaldehyde resins having therein a group selected from the class consisting of primary and secondary amine groups, the weight proportion of the amine resin to the product of the per-acid treatment being in the range of 45:55 to 65:35.

19. The method of preparing a hard, insoluble and thermoset coating on a substrate, which comprises applying to the substrate a film of a mixture of a composition containing the product of treating China-wood oil with a per-acid in the presence of an acid-activated ion-exchange resin until substantially the end of exothermal reaction and an amine resin selected from the group consisting of phenolic amine resins and urea formaldehyde resins having therein a group selected from the class consisting of primary and secondary amine groups in an amount sufficient to furnish cross-linking with said product of the per-acid treatment, and baking the same at a temperature of 500 to 575 degrees F. for about four to fourteen seconds.

20. The method of preparing a hard, insoluble and thermoset coating on a substrate, which comprises applying to the substrate a film of a mixture of a composition containing the product of treating China-wood oil with a per-acid in the presence of an acid-activated ion-exchange resin until substantially the end of exothermal reaction and an amine resin selected from the group consisting of phenolic amine resins and urea formaldehyde resins having therein a group selected from the class consisting of primary and secondary amine groups, the weight proportion of the amine resin to the product of the per-acid treatment being in the range of 45:55 to 65:35, and baking the same at a temperature and for a time sufficient to cross-link the mixture.

References Cited by the Examiner

UNITED STATES PATENTS

| | | | |
|---|---|---|---|
| 2,110,085 | 3/38 | Hopkins | 260—19 |
| 2,185,080 | 12/39 | Haroldson | 260—19 |
| 2,229,305 | 1/41 | Pratt et al. | 260—19 X |
| 2,283,353 | 5/42 | Clare | 260—19 |
| 2,433,832 | 1/48 | Aver | 260—19 |
| 2,451,153 | 10/48 | Charlton et al. | 260—19 |
| 2,926,149 | 2/60 | Backer | 260—19 |

FOREIGN PATENTS

| | | |
|---|---|---|
| 507,769 | 6/39 | Great Britain. |
| 549,303 | 11/42 | Great Britain. |
| 602,166 | 5/48 | Great Britain. |
| 819,104 | 8/59 | Great Britain. |

WILLIAM D. MARTIN, *Primary Examiner.*

JOSEPH REBOLD, RICHARD D. NEVIUS, MURRAY KATZ, *Examiners.*